United States Patent Office.

GEORGES DE LAIRE, OF PARIS, FRANCE, ASSIGNOR TO THE SOCIÉTÉ DE LAIRE & CO., OF SAME PLACE.

PROCESS OF MAKING VANILLOYL-CARBONIC ACID AND VANILLIN.

SPECIFICATION forming part of Letters Patent No. 497,546, dated May 16, 1893.

Application filed November 10, 1891. Serial No. 411,493. (Specimens.) Patented in England October 8, 1891, No. 17,137.

*To all whom it may concern:*

Be it known that I, GEORGES DE LAIRE, a citizen of the French Republic, and a resident of Paris, (Seine,) France, have invented certain new and useful Improvements in Vanilloyl-Carbonic Acid and Vanillin, (for which a patent has been granted in Great Britain, No. 17,137, dated October 8, 1891,) of which the following is a specification.

When vanillin is made by known methods (by the decomposition of eugenol or isoeugenol), a secondary product, besides vanillic acid and other different substances, is brought to light, which I have called vanilloyl-carbonic acid, and which has the following formula:

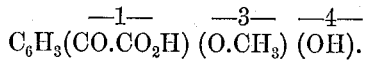
$$C_6H_3(CO.CO_2H)(O.CH_3)(OH).$$

So far as I am aware this body has never before been described nor indicated and I am the first to have isolated it.

My method is as follows: To an aqueous solution (rather weak) obtained by treating crude vanillin with bisulphite of soda in water, alcohol is added little by little. The mixture is allowed to stand until the alcohol rises to the top and can be wholly decanted and separated. In the alcohol will be found dissolved the salts of vanillin and in the aqueous liquor will be found dissolved the vanilloyl-carbonic acid. This aqueous liquor is then treated with sulphuric acid, when the vanilloyl-carbonic acid will be set free and may be taken up with ether. After evaporating the ether the oil remaining is dried in vacuo at 50° to 60° and then crystallized in benzine. The vanilloyl-carbonic acid thus isolated and purified melts at 134°. When heated above its point of fusion the acid separates into vanillin and carbonic acid. To purify the vanillin thus obtained and remove from it all traces of undecomposed vanilloyl-carbonic acid which may still remain on it, it is only necessary to dissolve in ether the fused mass of acid and agitate the etheric solution with water containing carbonate of magnesia in suspension. A salt is thus formed with the vanilloyl-carbonic acid, which salt is taken up by the water while the vanillin remains in the ether.

In lieu of carbonate of magnesia, other alkaline salts may be employed, as the carbonates of calcium, barium and strontium, or the bicarbonates of soda or potassium.

It will be seen that my process contains two steps. By the first step vanilloyl-carbonic acid is produced by a procedure which depends on the property possessed by the vanilloyl-carbonic acid of forming with bisulphite of soda, salts which are more difficult of solution in alcohol than the corresponding salts of vanillin, and by the second step the vanilloyl-carbonic acid is decomposed and the vanillin separated and purified by a procedure which depends on the property possessed by this acid of forming salts with alkaline carbonates which are soluble in water.

Having thus described my invention, I claim—

1. The herein described method of extracting vanilloyl-carbonic acid from the crude materials of the manufacture of vanillin, which consists in first treating crude vanillin with bisulphite of soda, in water then adding alcohol little by little until the latter takes up the salts of vanillin, then separating the alcoholic and aqueous solutions, then treating the aqueous liquor with sulphuric acid to set free the vanilloyl-carbonic acid, and dissolving out the latter with ether, and finally evaporating the ether and drying the acid.

2. The herein described method of extracting vanillin from vanilloyl-carbonic acid which consists in first heating said acid above its point of fusion, which causes it to separate into vanillin and carbonic acid, then dissolving the fused mass in ether, then agitating this ethereal solution with an aqueous solution of an alkaline carbonate or bicarbonate and then separating and evaporating the ether which holds the vanillin in solution.

3. The herein described method of producing vanillin, which consists in first treating crude vanillin with bisulphite of soda in water, then adding alcohol until it takes up the salts of vanillin, then separating the alcoholic and aqueous solutions, then treating the aqueous liquor with sulphuric acid, which sets free the vanilloyl-carbonic acid, then dissolving out the latter with ether, then heating the dried vanilloyl-carbonic acid recovered from the ether above its point of fusion to decompose it, then digesting the fused mass in ether to form an ethereal solution of vanillin, and finally agitating said solution with an aqueous solution of an alkaline carbonate or bicarbonate and separating and evaporating the ether to recover the vanillin.

In witness whereof I have hereunto signed my name in the presence of two subscribing witnesses.

GEORGES DE LAIRE.

Witnesses:
JULES ARMENGAUD, Jeune,
ROBT. M. HOOPER.